(12) United States Patent
Egashira et al.

(10) Patent No.: US 8,053,524 B2
(45) Date of Patent: *Nov. 8, 2011

(54) GOLF BALL MATERIAL, GOLF BALL AND METHOD FOR PREPARING GOLF BALL MATERIAL

(75) Inventors: Yoshinori Egashira, Chichibu (JP); Eiji Takehana, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 145 days.

This patent is subject to a terminal disclaimer.

(21) Appl. No.: 12/503,653

(22) Filed: Jul. 15, 2009

(65) Prior Publication Data

US 2010/0009779 A1    Jan. 14, 2010

Related U.S. Application Data

(60) Division of application No. 12/127,526, filed on May 27, 2008, now abandoned, which is a continuation of application No. 11/211,595, filed on Aug. 26, 2005, now Pat. No. 7,393,289.

(51) Int. Cl.
*A63B 37/00* (2006.01)
*C08L 33/02* (2006.01)
*C08L 59/00* (2006.01)

(52) U.S. Cl. ........ 525/154; 525/127; 525/130; 525/176; 525/195; 525/196; 525/201; 525/221; 525/330.2; 473/373; 473/378; 473/385

(58) Field of Classification Search ............... None
See application file for complete search history.

(56) References Cited

U.S. PATENT DOCUMENTS

| 3,264,272 A | 8/1966 | Rees |
| 4,235,980 A | 11/1980 | Bateman |
| 4,440,908 A | 4/1984 | McClain |
| 4,473,683 A | 9/1984 | Coran et al. |
| 4,766,174 A | 8/1988 | Statz |
| 4,774,290 A * | 9/1988 | Neill et al. .................. 525/196 |
| 5,306,760 A | 4/1994 | Sullivan |
| 5,312,857 A | 5/1994 | Sullivan |
| 5,681,898 A | 10/1997 | Pocklington |
| 6,124,389 A | 9/2000 | Cavallaro et al. |
| 6,761,648 B2 | 7/2004 | Takesue et al. |
| 6,786,839 B2 | 9/2004 | Hayashi et al. |
| 6,838,501 B2 | 1/2005 | Takesue et al. |
| 7,037,963 B2 | 5/2006 | Takesue et al. |
| 7,393,289 B2 | 7/2008 | Egashira et al. |
| 7,514,505 B2 * | 4/2009 | Egashira et al. ............. 525/196 |
| 7,635,730 B2 * | 12/2009 | Egashira et al. ............. 523/351 |
| 7,803,874 B2 * | 9/2010 | Egashira et al. ............. 525/126 |
| 2004/0044136 A1 | 3/2004 | Kim |
| 2005/0148725 A1 * | 7/2005 | Statz et al. ................... 524/523 |
| 2006/0030668 A1 | 2/2006 | Egashira et al. |
| 2009/0221385 A1 * | 9/2009 | Egashira et al. ............. 473/372 |

FOREIGN PATENT DOCUMENTS

| EP | 135263 A1 | 3/1985 |
| GB | 1148529 A | 4/1969 |
| JP | 2004352975 A | 12/2001 |
| JP | 2002-219195 A | 6/2002 |
| JP | 2003-339910 A | 2/2003 |
| JP | 2004-180725 A | 2/2004 |
| JP | 2004-180801 A | 2/2004 |
| JP | 2004352975 | * 12/2004 |
| WO | 98/46671 A1 | 10/1998 |

* cited by examiner

*Primary Examiner* — David Buttner
(74) *Attorney, Agent, or Firm* — Sughrue Mion, PLLC

(57) ABSTRACT

A golf ball material composed of (A) an olefin-containing thermoplastic polymer having an acid content of at least 0.5 wt % but less than 5.0 wt %, (B) a resin composition which includes one or more selected from the group consisting of diene polymers, thermoplastic polymers and thermoset polymers, and (C) an oxygen-containing inorganic metal compound has a good thermal stability, flow and processability, making it suitable for injection molding. The golf ball material is ideal for the production of high-performance golf balls endowed with durability, scuff resistance and optimal hardness without a loss of rebound in the molded article.

14 Claims, No Drawings

GOLF BALL MATERIAL, GOLF BALL AND METHOD FOR PREPARING GOLF BALL MATERIAL

This application is a divisional of application Ser. No. 12/127,526 filed May 27, 2008, now abandoned, which is a continuation of application Ser. No. 11/211,595, now U.S. Pat. No. 7,393,289, filed Aug. 26, 2005 issued Jul. 1, 2008 of Yoshinori EGASHIRA and Eiji TAKEHANA entitled GOLF BALL MATERIAL, GOLF BALL AND METHOD FOR PREPARING GOLF BALL MATERIAL. The entire disclosures of application Ser. Nos. 11/211,595 and 12/127,526, are incorporated by reference.

BACKGROUND OF THE INVENTION

The present invention relates to a golf ball material which has a good thermal stability, flowability and processability and from which there can be obtained high-performance golf balls endowed with excellent properties such as rebound and durability. The invention also relates to a golf ball that includes as an essential component a molding made from such a golf ball material, and to a method for preparing such a golf ball material.

Lately, ionomer resins have been widely used in cover materials for golf balls. Ionomer resins are ionic copolymers of an olefin such as ethylene with an unsaturated carboxylic acid such as acrylic acid, methacrylic or maleic acid, in which some of the acid groups are neutralized with metal ions such as sodium, lithium, zinc or magnesium. These resins provide excellent characteristics in terms of durability, rebound and scuff resistance of the ball.

Today, the base resins used in cover materials for golf balls are mostly ionomer resins, but a variety of modifications are being made to address the constant desire by golfers for golf balls having a high rebound and an excellent flight performance.

For example, to improve the rebound and cost characteristics of ionomer cover materials, U.S. Pat. Nos. 5,312,857, 5,306,760 and International Application WO 98/46671 describe cover materials composed of ionomer resins to which a large amount of metallic soap has been added.

However, the metallic soap in such cover materials undergoes decomposition and vaporization during injection molding, generating a large amount of fatty acid gas. As a result, molding defects tend to arise. Moreover, the gas that is generated adheres to the surface of the molding, markedly lowering its paintability. The rebound performance obtained with these cover materials does not differ to any considerable extent from the rebound obtained with ionomer covers of the same hardness which contain no metallic soap; either the rebound in both cases is about the same or, at most, only a small positive effect is observable from the addition of a metallic soap. Hence, such addition does not markedly increase rebound. Moreover, depending on the type of metallic soap used, the processability and the rebound are sometimes greatly deteriorated or degraded, making the cover material entirely unfit for practical use.

An ionomer for use as a golf ball material has recently been developed in the form of a high rebound resilience material having an interpenetrating network (IPN) structure and a homogeneous phase. The ionomer is obtained by mixing a first component that is typically an ethylene-(meth)acrylic acid copolymer with a second component that is typically a different type of thermoplastic resin so to form a resin composition, then adding a metal ionic species as a third component to neutralize the acid in the first component dispersed within the resin composition (U.S. Patent Application No. 2004/0044136). However, in this prior-art production method, since a metal ionic species such as a metal oxide, metal hydroxide or metal carbonate is used directly in the form of a solid (powder or granular material) and in some case a high acid content in the first component makes it necessary to include a large amount of the metal ionic species required to neutralize the acid, poor dispersion may arise during mixing, leaving some of the metal ions unreacted when the metal ionic species is added. There is a concern that such unreacted metal ions may degrade the physical properties of the ionomer material formed.

In taking into account the viewpoints above, it is an object of the invention to use a low acid-content material having primarily an acid anhydride so as to minimize the amount of metal ionic species required for acid neutralization and enhance the dispersibility and neutralization reactivity, and thereby provide a golf ball material which has a good thermal stability, flowability and processability and from which there can be obtained a high-performance golf ball having excellent properties, such as durability, scuff resistance and optimal hardness, without sacrificing or losing rebound. Another object of the invention is to provide a golf ball containing as an essential component a molding made from such a golf ball material. A further object of the invention is to provide a method for preparing such a golf ball material.

SUMMARY OF THE INVENTION

As a result of extensive investigations, it was found out that a golf ball material obtained by blending as the essential components (A) an olefin-containing thermoplastic polymer having an acid content of at least 0.5 wt % but less than 5.0 wt %, (B) a resin composition which includes one or more selected from the group consisting of diene polymers, thermoplastic polymers and thermoset polymers and (C) an oxygen-containing inorganic metal compound, has a surprisingly good thermal stability, flow and processability, making it suitable for injection molding and that moreover it is ideal for producing high-performance golf balls of excellent properties, including durability, scuff resistance and optimal hardness, without compromising the rebound of moldings made from the material.

It is also found that golf balls in which a molding made from such a golf ball material is used as an essential component, specifically as the cover material or intermediate layer material in a two-piece solid golf ball composed of a core and a cover which encloses the core or a multi-piece solid golf ball composed of a core of at least one layer, at least one intermediate layer which encloses the core, and a cover of at least one layer which encloses the intermediate layer, exhibit an excellent durability, excellent scuff resistance and optimal hardness without a loss of rebound.

Accordingly, the invention provides the following golf ball material [I], golf ball [II], and method for preparing golf ball materials [III].

[I] A golf ball material characterized by comprising a blend of the following essential components A, B and C:
(A) an olefin-containing thermoplastic polymer having an acid content of at least 0.5 wt % but less than 5.0 wt %;
(B) a resin composition comprising one or more selected from the group consisting of diene polymers, thermoplastic polymers and thermoset polymers; and
(C) an oxygen-containing inorganic metal compound.

[II] A golf ball characterized by comprising a molding made from the golf ball material of the foregoing golf ball material. In particular, a golf ball characterized by use of the foregoing golf ball material as a cover material or intermediate layer material in a two-piece solid golf ball composed of a core and a cover which encloses the core, or in a multi-piece solid golf ball composed of a core of at least one layer, at least one intermediate layer which encloses the core, and a cover of at least one layer which encloses the intermediate layer.

[III] A method for preparing a golf ball material composed of a blend of the following essential components A to C:

(A) an olefin-containing thermoplastic polymer having an acid content of at least 0.5 wt % but less than 5.0 wt %;

(B) a resin composition comprising one or more selected from the group consisting of diene polymers, thermoplastic polymers and thermoset polymers; and (C) an oxygen-containing inorganic metal compound;

the method being characterized by melt-mixing component A and component B at a temperature which exceeds the melting points of both components to form a resin composition thereof, then with which component C blends in, so as to enable at least some of the acid groups present in the resin composition of components A and B to be neutralized.

DETAILED DESCRIPTION OF THE INVENTION

The inventive method of manufacturing golf balls is described more fully below.

The golf ball material of the invention is a blend composed of components A, B and C described below as the essential components.

Component A in the invention is an olefin-containing thermoplastic polymer having an acid content of at least 0.5 wt % but less than 5.0 wt %.

The olefin in component A generally has at least 2 carbons and up to 8 carbons, most preferably up to 6 carbons. Examples of such olefins include ethylene, propylene, butene, pentene, hexene, heptene and octene. The use of ethylene is especially preferred.

The acid-containing component (including derivatives thereof) in component A include unsaturated carboxylic anhydrides, unsaturated dicarboxylic acids, unsaturated dicarboxylic acid half esters and unsaturated carboxylic acids. Exemplary unsaturated carboxylic anhydrides include maleic anhydride and itaconic anhydride; maleic anhydride is especially preferred. Exemplary unsaturated dicarboxylic acids include maleic acid, fumaric acid, and itaconic acid. Exemplary unsaturated dicarboxylic acid half esters include monoesters of these dicarboxylic acids, such as maleic acid monoethyl ester, fumaric acid monomethyl ester and itaconic acid monoethyl ester. The use of maleic acid monoethyl ester is especially preferred. Exemplary unsaturated carboxylic acids include acrylic acid, methacrylic acid and ethacrylic acid. The use of acrylic acid or methacrylic acid is especially preferred.

Preferred examples of unsaturated carboxylic acid esters that may be used in component A include the lower alkyl esters of the above-mentioned unsaturated carboxylic acids. Illustrative examples include methyl methacrylate, ethyl methacrylate, propyl methacrylate, butyl methacrylate, methyl acrylate, ethyl acrylate, propyl acrylate and butyl acrylate. The use of a butyl acrylate (n-butyl acrylate, isobutyl acrylate) is especially preferred.

As typical examples, the following one or more can be used as component A:

(i) an olefin polymer onto which an unsaturated carboxylic anhydride, unsaturated dicarboxylic acid and/or unsaturated carboxylic acid has been grafted (including polymers prepared with a metallocene catalyst);

(ii) an olefin-unsaturated carboxylic acid polymer onto which an unsaturated carboxylic anhydride, unsaturated dicarboxylic acid and/or unsaturated carboxylic acid has been grafted;

(iii) an olefin-unsaturated carboxylic acid ester polymer onto which an unsaturated carboxylic anhydride, unsaturated dicarboxylic acid and/or unsaturated carboxylic acid has been grafted;

(iv) an olefin-unsaturated carboxylic acid-unsaturated carboxylic acid ester polymer onto which an unsaturated carboxylic anhydride, unsaturated dicarboxylic acid and/or unsaturated carboxylic acid has been grafted;

(v) an olefin-unsaturated carboxylic anhydride-unsaturated carboxylic acid ester polymer;

(vi) an olefin-unsaturated dicarboxylic acid-unsaturated carboxylic acid ester polymer;

(vii) an olefin-unsaturated dicarboxylic acid half ester-unsaturated carboxylic acid ester polymer;

(viii) an olefin-unsaturated carboxylic acid polymer;

(ix) an olefin-unsaturated carboxylic acid-unsaturated carboxylic acid ester polymer.

These copolymers can be obtained by using a known method to copolymerize and graft the respective raw materials (e.g., monomers).

It is recommended that the content of the unsaturated carboxylic anhydride, unsaturated dicarboxylic acid, unsaturated dicarboxylic acid half ester and unsaturated carboxylic acid (i.e., the acid content) in component A be controlled within a specific range. Specifically, the total content of the unsaturated carboxylic anhydride, unsaturated dicarboxylic acid, unsaturated dicarboxylic acid half ester and unsaturated carboxylic acid included in the copolymer is at least 0.5 wt % but less than 5 wt %, and preferably at least 1.0 wt % but not more than 4.0 wt %. Too low an acid content in the copolymer will lose or degrade or deteriorate the rebound and strength (tensile strength at break), whereas too high an acid content will lose or degrade or deteriorate the processability.

Commercially available products of unsaturated carboxylic anhydride-grafted polymers used as component A include Polybond 3009, Polybond 3200 and Royaltough 498 (all products of Uniroyal Chemical), ADOMER NF518 and ADOMER QE800 (both products of Mitsui Chemicals, Inc.), Bynel 2167, Bynel 2174, Bynel 4206, Bynel 4288, Bynel 50E561 and Bynel 50E571 (all products of DuPont), and Exxelor VA1801, Exxelor VA1803, Exxelor VA1840 and Exxelor PO1020 (all products of Exxon-Mobil Chemical). Commercially available products of unsaturated carboxylic anhydride polymers used as component A include MODIPER A8100, MODIPER A8200 and MODIPER A8400 (all products of NOR Corporation), LOTADER 3200, LOTADER 3300, LOTADER 5500, LOTADER 6200, LOTADER 7500, LOTADER 8200 and LOTADER TX8030 (all products of ATOFINA), and Vamac G (a product of DuPont). Commercially available products of olefin-unsaturated carboxylic acid-unsaturated carboxylic acid ester polymers used as component A include Bynel 2002, Bynel 2014, Bynel 2022 and Bynel E403 (all products of DuPont), and ESCOR ATX325, ESCOR ATX320 and ESCOR ATX310 (all products of Exxon-Mobil Chemical). Commercially available products of olefin-unsaturated carboxylic acid polymers used as component A include Nucrel 960 and Nucrel 2806 (both products of DuPont), ESCOR 5200, ESCOR 5100 and ESCOR 5000 (all products of Exxon-Mobil Chemical), and AN4214C (a product of DuPont-Mitsui Polychemicals Co., Ltd.).

Next, component B in the invention is a resin composition made up of one or more polymers selected from the group consisting of diene polymers, thermoplastic polymers and thermoset polymers. Preferred examples include resin compositions made up of one or more selected from the group consisting of polyolefin elastomers, polystyrene elastomers, polyacrylate polymers, polyamide elastomers, polyurethane elastomers, polyester elastomers, diene polymers, polyacetals (POM), epoxy resins, unsaturated polyester resins, silicone resins and ABS resins.

If above component B is a diene polymer, it is especially preferable to use a polybutadiene having a cis-1,4 bond content of at least 60%, a 1,2-vinyl bond content of not more than 4%, a Mooney viscosity ($ML_{1+4}$ (100° C.) of 35 to 65, a weight-average molecular weight (Mw) of 450,000 to 850,000, and a weight-average molecular weight (Mw) to number-average molecular weight (Mn) ratio of at most 5. Illustrative examples include polybutadienes prepared using a nickel catalyst and polybutadienes prepared using a lanthanoid catalyst, of which the latter is preferred.

The polybutadiene, above component B, can be used alone and/or as a composition in admixture with an acid anhydride and a radical reagent. By kneading together component A and such a polybutadiene-containing composition, then blending in with component C, metal ion crosslinking through neutralization can be carried out. Simultaneously, an acid anhydride grafting reaction occurs and covalent bond crosslinking of the polybutadiene takes place, resultingly enabling a material of a homogeneous phase to be obtained.

For use of the inventive golf ball material as an injection molding material, it is essential that component A serve as the matrix. Accordingly, the blending ratio by weight of component A to the polybutadiene serving as component B, indicated as A/B, is generally in a range of 50/50 to 99/1, and especially 55/45 to 95/5. A neutralization reaction of a composition of A/B with component C is then carried out. The resulting golf ball material is characterized by having an excellent heat resistance, even though the polybutadiene serving as component B is involved in the component A matrix.

Above component B is an essential ingredient for further improving the specific gravity control (specific gravity of 1.0 or more), fatigue resistance, dimensional stability, abrasion resistance, impact resistance, processability, and feeling of the golf ball when hit (concerning suitable hardness and flexural modulus). Polyacetals, which have excellent fatigue resistance, dimensional stability, wear resistance, impact resistance, flexural modulus, thermal stability and processability, are especially preferred as component B. Polyacetals are also suitable as a hardness-increasing material for imparting a high hardness. If the polyacetal as component B can be uniformly dispersed in component A, it is expected to provide a high hardness ionomer-based golf ball material at an acid content of less than about 5 wt %.

When component B is a polyacetal (POM), the use of a polyacetal homopolymer and/or a polyacetal copolymer having an impact strength (¼-inch notched, at 23° C., ASTM D256) of 35 to 130 J/m and a flexural modulus (ASTM D790) of 2.50 to 3.10 GPa is preferred.

Commercially available polyacetal homopolymers used as component B include Tenac 5050 and Tenac 7010 (both available from Asahi Kasei Chemicals Corporation), and Delrin 500P (available from DuPont). Commercially available polyacetal copolymers used as component B include Amilus S731 and Amilus S761 (both available from Toray Industries, Inc.), Duracon M140S (available from Polyplastics Co., Ltd.) and Tenac 7520 (available from Asahi Kasei Chemicals Corporation). In addition to their copolymers, typical examples of comonomers used in polyacetal copolymers include alkylene oxides such as ethylene oxide and 1,3-dioxolane.

In the practice of the invention, the weight ratio of component A to component B, indicated as A/B, is generally from 50/50 to 99/1, and preferably from 55/45 to 95/5. It is preferable for the resin composition of components A and B to have an acid content of at least 0.1 wt % but less than 5.0 wt % with at least one type of acid selected from among unsaturated carboxylic anhydrides, unsaturated dicarboxylic acids, unsaturated carboxylic acid half esters and unsaturated carboxylic acids.

Excessive amount of component B may lower the compatibility of components A and B and may also make the overall composition more brittle, which may greatly deteriorate the durability.

If component B is a thermoset polymer, the ratio by weight of component A to component B, indicated as A/B, is generally from 55/45 to 99/1, and preferably from 60/40 to 99/5.

Component C in the invention is an oxygen-containing inorganic metal compound. This component C is preferably selected from among metal oxides, metal carbonates and metal hydroxides. The metal ionic species (A) is generally one or more selected from among groups IA, IB, IIA, IIB, IIIA, IIIB, IVA, IVB, VA, VB, VIA, VIB, VIIB and VIIIB of the periodic table. Component C is used in at least one form selected from among (i) a master batch composed of the oxygen-containing inorganic metal compound and a polymer material; (ii) finely ground particles of the oxygen-containing inorganic metal compound; and (iii) a solution of the oxygen-containing inorganic metal compound.

The advantages of using a master batch composed of the oxygen-containing inorganic metal compound and a polymer material are that when component C used as a master batch type is blended into the above-described resin composition of components A and B and to neutralize at least some of the acid groups in the resin composition, the oxygen-containing inorganic metal compound can be uniformly dispersed in the resin composition, further accelerating a uniform reaction and making it possible to impart uniformity to the golf ball material. On the other hand, if the oxygen-containing inorganic metal compound is not prepared as a master batch and is directly blended as it is with the above-described resin composition, there may be a difficulty in uniformly dispersing the oxygen-containing inorganic metal compound in the resin composition to form undispersed masses, resulting in a non-uniform reaction to form a heterogeneous material, which may in turn make it impossible to achieve the target properties of the golf ball material. In particular, if the oxygen-containing inorganic metal compound is in the form of a grainy powder, undispersed masses may remain in the golf ball material. Also, for making the reaction system uniform to further accelerate the reaction, it is advantageous to preferentially prepare a master batch of an organic acid-free oxygen-containing inorganic metal compound which does not release organic acid following the neutralization reaction. That is, by preparing a master batch, there is no need for the deliberate use of an organic acid metal salt that releases an organic acid. The use of a master batch is more desirable for the neutralization reaction.

When component C is a master batch composed of an oxygen-containing inorganic metal compound and a polymer material, the polymer material used to prepare the master batch is preferably one having a high melt flow rate (MFR). The polymer material is typically one having an MFR of preferably at least 10 g/10 min, more preferably at least 50 g/10 min, and even more preferably at least 100 g/10 min. Use can also be made of a liquid wax such as a high-MFR ethylene wax, or a low-acid, high-MFR ethylene polymer. Specific examples include Polyethylene Wax AC5120 (available from Tomen Plastics Corporation; acrylic acid content, 15 wt %; MFR, >500 g/10 min), Nucrel 599 (available from DuPont; methacrylic acid content, 10 wt %; MFR, 450 g/10 min), Nucrel 699 (available from DuPont; methacrylic acid content, 11 wt %; MFR, 100 g/10 min), and Nucrel N0200H (available from DuPont-Mitsui Polychemicals Co., Ltd.; methacrylic acid content, 2 wt %; MFR, 130 g/10 min). One or more polymer materials described above can also be used for preparing a master batch.

When component C is a master batch composed of an oxygen-containing inorganic metal compound and a polymer material, the concentration of the oxygen-containing inorganic metal compound in the high-MFR thermoplastic resin-based master batch is generally 10 to 90 wt %, preferably 20 to 80 wt %, and more preferably 30 to 70 wt %. If the concentration of the oxygen-containing inorganic metal compound in the master batch is too high, the master batch may have a melt flow rate of less than 0.1 g/10 min, which is too low. In such a case, blending the master batch together with the above-described A/B resin composition may cause insufficient dispersion of the oxygen-containing inorganic metal compound in the master batch. On the other hand, if the concentration is low, a larger amount of the master batch may be added, allowing the influence of the high-MFR thermoplastic resin (e.g., ethylene waxes, low-acid content, high-MFR ethylene polymers) used in the master batch to emerge, which may markedly lower the physical properties of the golf ball material.

Illustrative examples of the metal ions in the oxygen-containing metal compound of component C include $Li^+$, $Na^+$, $K^+$, $Ca^{2+}$, $Mg^{2+}$, $Zn^{2+}$, $Al^{3+}$, $Ni^{2+}$, $Fe^{2+}$, $Cu^{2+}$, $Mn^{2+}$, $Sn^{2+}$, $Pb^{2+}$ and $Co^{2+}$. Known oxygen-containing inorganic metal compounds containing these metal ions can be used. Illustrative examples include one or more selected from the group consisting of magnesium carbonate, magnesium acetate, magnesium oxide, zinc oxide, zinc acetate, sodium hydroxide, sodium carbonate, calcium oxide, calcium hydroxide, lithium hydroxide, lithium carbonate, potassium hydroxide and potassium carbonate.

When the oxygen-containing metal compound of component C is in the form of a powder, the average particle size is generally at least 0.005, and preferably at least 0.01 μm, but generally not more than 50 μm, and preferably not more than 20 μm. An excessively large particle size may prevent the completion of neutralization reaction. On the other hand, an excessively small size may result in poor dispersion.

The particle size distribution is generally in the range of from at least 0.001 μm, and preferably at least 0.005 μm, up to generally not more than 300 μm, and preferably not more than 100 μm. Outside of this particle size distribution, the flow properties following the neutralization reaction may diminish or the neutralization reaction may not be completely finished. Within this particle size distribution, it is preferable for the proportion of particles having a particle size of 0.05 μm or less to be at least 20%, and preferably at least 30%. If this proportion is less than 20%, it may take an excessive amount of the powder to have the desired neutralization reaction completed, in addition to which the flow may be poor and the processability may diminish. When such a powder is used in a golf ball material, that portion of the powder having a large particle size can function as a filler.

Alternatively, component C may be a finely ground metal oxide which is selected from among oxygen-containing inorganic metal compounds and preferably has an average particle size of 0.005 to 0.1 μm and a particle size distribution of 0.001 to 1.0 μm. Illustrative examples include zinc oxide, magnesium oxide and calcium oxide. The use of these compounds is preferred because they provide numerous advantages compared with metal hydroxides (strongly alkaline), metal carbonates (which release carbon dioxide after neutralization) and metal acetates (which release acetic acid after neutralization). These advantages include: (i) a low manufacturing equipment corrosiveness, (ii) ease of handling because they are powders, (iii) high acid group neutralizing reactivity, (iv) completion of the neutralization reaction to the acid groups of the resin composition for a short time, and (v) a relatively low neutralizing reaction temperature (130° C. and above). In particular, it is preferable for component C to be in the form of the fine particulate described here when it is not prepared as a master batch but is instead directly blended into a resin composition of components A and B. In addition, the use of component C as a solution, such as an aqueous solution, is desirable when an oxygen-containing inorganic metal compound (e.g., sodium hydroxide, potassium hydroxide, barium hydroxide) that dissolves in a volatile solvent such as water is used.

As used herein, "average particle size" and "particle size distribution" refer to values obtained by particle size distribution measurement using a laser diffraction technique (laser diffraction/scattering).

The amount of Component C included in the inventive golf ball material is set as needed to achieve the target degree of neutralization of the acid groups present in the above-described composition of components A and B. Excessive amount of component C may result in an excessive degree of neutralization, lowering the flow properties (MFR) of the golf ball material and deteriorating the processability. On the other hand, too little component C may compromise the physical properties, rebound resilience, and durability as a golf ball material.

In the golf ball material of the invention, at least some of the unneutralized acid groups present in the above-described composition of components A and B are neutralized by component C. In the practice of the invention, the proportion of neutralized acid groups based on all the acid groups within the resin composition, that is, the degree of neutralization, is generally at least 2 mol %, preferably at least 5 mol %, and more preferably at least 10 mol %, but generally not more than 98 mol %. To achieve a good uniformity in the golf ball material of the invention, it is advantageous for the degree of neutralization to be set as high as possible without sacrificing or losing desirable properties such as flow and processability.

Optional additives may be suitably included in the golf ball material of the invention. If the golf ball material of the invention is to be used as a cover material, additives such as pigments, dispersants, antioxidants, ultraviolet absorbers and light stabilizers may be included together with above components A, B and C. When such additives are included, the amount of addition per 100 parts by weight of components A, B and C combined is generally at least 0.1 part by weight, and preferably at least 0.5 part by weight, but generally not more than 10 parts by weight, and preferably not more than 4 parts by weight.

The golf ball material of the invention can be obtained by mixing the various above components using, for example, an internal mixer such as a kneading-type twin-screw extruder, a Banbury mixer, a kneader or a Labo Plastomill. A twin-screw extruder having features (i) to (v) below is especially preferred for preparing the golf ball material.

(i) An effective screw length L/D (screw length-to-diameter ratio) of at least 20, preferably at least 25, and more preferably at least 30.

(ii) A screw segment arrangement such that the L/D ratio of the kneading disc zone is 10 to 90%, preferably 20 to 80%, and more preferably 30 to 70%, of the whole L/D.

Also, the discs in the kneading disc zone of the twin-screw extruder consist of right-handed kneading discs, left-handed kneading discs, reverse discs, and various neutral discs.

(iii) A screw diameter of at least 15 mm.

(iv) Includes a vent port and a vacuum line connected thereto.

(v) Equipped with a device for the dropwise addition or pressurized injection of a liquid.

After above components A and B are melt-mixed to form a molten resin composition, component C is blended into the molten resin composition, and a liquid may also be added (by injection under pressure or by dropwise addition) to accelerate the neutralization of at least some of the acid groups present in the resin composition of components A and B. The liquid used in this case is preferably a compound of the formula ROH, where R represents a hydrogen or an alkyl group. This liquid is added in an amount, based on the whole output of resin extrusion, of preferably 0.1 to 10 wt %, more preferably 0.5 to 8 wt %, and even more preferably 1.0 to 5.0 wt %.

The heating conditions can be set to, for example, 100 to 250° C. In particular, it is preferable for melt mixing to be carried out at a temperature which exceeds the melting points of both component A and component B.

Although the mixing method is not subject to any particular limitation, for better microdispersion of component C, it is preferable to first thoroughly melt-mix components A and B so as to form a resin composition, then to which component C is added and mixed. If additives are to be included, it is also possible to add and mix the additives into the composition following the incorporation of component C.

If the material is prepared using a twin-screw extruder having a screw diameter of 32 mm (L/D=41), for example, it is desirable to set the extrusion output to 2 to 50 kg/h, and preferably 3 to 45 kg/h. If a Banbury mixer or a kneader is used, the component A and B melt-mixing time is generally set to from 10 seconds to 30 minutes, and preferably from 30 seconds to 20 minutes. The mixing time following the addition of component C is generally set to from 10 seconds to 30 minutes, and preferably from 15 seconds to 25 minutes.

It is preferable to provide the golf ball material of the invention with a melt flow rate (MFR) within a specific range so as to ensure that it has flow properties which are particularly suitable for injection molding and to improve the processability. The melt flow rate is generally at least 0.05 g/10 min, and preferably at least 0.1 g/10 min, but generally not more than 50 g/10 min, and preferably not more than 30 g/10 min. A melt flow rate which is excessively large or excessively small may significantly reduce the processability of the golf ball material.

As used herein, "melt flow rate" refers to a measured value obtained in accordance with JIS-K7210 at a test temperature of 190° C. and a load of 21.18 N (2.16 kgf).

The golf ball material of the invention has, in Fourier transform infrared absorption spectroscopic (FT-IR) measurements, an absorption peak attributable to carbonyl stretching vibrations at 1690 to 1710 $cm^{-1}$ and an absorption peak attributable to the carboxylate anion stretching vibrations of a carboxylate metal salt at 1530 to 1630 $cm^{-1}$, confirming the neutralization reaction and the presence of ionic crosslinkings.

Moldings obtained using the golf ball material of the invention have a Shore D hardness of generally at least 40, and preferably at least 45, but generally not more than 75, and preferably not more than 70. If the Shore D hardness is too high, the "feeling" of the ball when hit may diminish markedly. On the other hand, if the Shore D hardness is too low, the rebound of the ball may decrease.

The golf ball material of the invention has a specific gravity of generally at least 0.9, preferably at least 0.92, and more preferably at least 0.94, but generally not more than 1.3, preferably not more than 1.2, and more preferably not more than 1.05.

The golf ball of the invention is a golf ball which includes as an essential component therein a molding made from the inventive golf ball material described above. Moldings made from the above golf ball material may be used as part or whole of the golf ball. Examples include the cover of thread-wound golf balls in which the cover has a single-layer structure or a multilayer structure of two or more layers; one-piece golf balls; the solid core or cover of two-piece solid golf balls; and the solid core, intermediate layer or cover of multi-piece solid golf balls such as three-piece solid golf balls. The type of golf ball is not subject to any particular limitation, provided it is a golf ball which includes as an essential component a molding of the inventive golf ball material.

It is particularly advantageous for the golf ball material of the invention to be used as the cover material in a two-piece solid golf ball composed of a core and a cover which encloses the core, or as the cover material or intermediate layer material in a multi-piece solid golf ball composed of a core of at least one layer, at least one intermediate layer which encloses the core, and at least one cover which encloses the intermediate layer.

Two-piece solid golf balls composed of a butadiene rubber core and a cover injection-molded from the golf ball material prepared by the above-described method were fabricated and evaluated, from which it was found that golf balls having the following performance and effects can be obtained. The results indicated below were obtained by comparing the invention with, as controls, golf balls in which the cover material was a melt-blended composition of a metal ionic species-containing ionomer (component A) and component B.

a) Cover surface of excellent uniformity.
b) Excellent scuff resistance.
c) Excellent durability (number of shots).
d) High hardness.
e) Excellent heat resistance.
f) Partially interpenetrating network structure.

EXAMPLES

Examples are given below by way of illustration and not by way of limitation. The twin-screw extruder for the neutralization reaction that was used in the invention had a screw diameter of 32 mm, an overall L/D ratio of 41, and an L/D ratio for the kneading disc zone which was 40% of the overall L/D ratio. Moreover, it had a vacuum vent port and was equipped with a device for injecting water under pressure.

Example 1

A golf ball material formulated was prepared by dry blending POM and polymer A in the proportions indicated in Table 1, then feeding the blend to the hopper of a twin-screw extruder set to a temperature of 180° C. and melt mixing the resins at a screw speed of 70 rpm and an extrusion rate of 10 kg/h while removing volatiles through a vacuum vent. The mixture was extruded as a strand from the extruder die, and passed through a cooling water bath. Excess water was removed with an air knife, then the strand was cut into pellets with a pelletizer, giving a melt blend.

The resulting melt blend and ZnO-1 were separately fed in the proportions indicated in Table 1 to the hopper of the above twin-screw extruder set to a temperature of 190° C. and melt-mixed at a screw speed of 70 rpm and an extrusion rate of 10 kg/h while removing volatiles through the vacuum vent. The resulting mixture was pelletized in the same way as described above, yielding a uniform mixed composition of POM, polymer A and ZnO-1 (abbreviated below as "POM/polymer A/ZnO-1 mixed composition"). Pellets of the resulting uniform, transparent composition were used to form a 3 mm thick sheet having a length and width of 150 mm each in a hot press molding machine. The sheet was visually examined, and found to be free of ZnO-1 in unreacted form and as undispersed masses. The properties of the resulting golf ball material were then evaluated. The results are shown in Table 1.

Example 2

Aside from using the ZnO-2MB (master batch is abbreviated here as "MB") prepared in Example 8 instead of ZnO-1, a uniform POM/Polymer A/ZnO-2MB mixed composition was obtained by repeating the same operations in Example 1 using the proportions indicated in Table 1. Pellets of the resulting uniform mixed composition were used to form a 3 mm thick sheet having a length and width of 150 mm each in a hot press molding machine. The sheet was visually examined, and found to be free of ZnO-2 in unreacted form and as undispersed masses. The properties of the resulting golf ball material were then evaluated. The results are shown in Table 1.

Example 3

A 5-liter pressure kneader (temperature setting, 100° C.) was charged with a combined amount of 2.5 kg of BR01 and Polymer A in the relative proportions shown in Table 1, and mixing was carried out for 20 minutes at a rotor speed of 35 rpm and an applied pressure of 0.49 MPa while controlling the mixing temperature within a range of 110 to 120° C. The mixture was extruded as a strand from a 40 mm diameter twin-screw/single-screw extruder (temperature setting, 140° C.), and passed through a cooling water bath. Excess water was removed with an air knife, then the strand was cut into pellets with a pelletizer. The resulting mixture of BR 01 and Polymer A was fed to the hopper of a twin-screw extruder set to a temperature of 170° C. and melt-mixed at a screw speed of 70 rpm and an extrusion rate of 10 kg/h while injecting a 30 wt % aqueous sodium hydroxide solution at a rate of 7.44 ml/min with a liquid injection pump so as to set the amount of sodium hydroxide (NaOH) addition as indicated in Table 1 and while removing volatiles through a vacuum vent. The mixture was extruded as a strand from the extruder die, and passed through a cooling water bath. Excess water was removed with an air knife, then the strand was cut into pellets with a pelletizer, giving a uniform BR 01/Polymer A/NaOH mixed composition. Pellets of the resulting uniform mixed composition were used to form a 3 mm thick sheet having a length and width of 150 mm each in a hot press molding machine. The sheet was visually examined, and found to be free of unreacted NaOH and free of undispersed masses of BR. The properties of the resulting golf ball material were then evaluated. The results are shown in Table 1.

Example 4

Aside from adding Polymer C to BR 01 and Polymer A, adjusting the injection rate of the 30 wt % aqueous sodium hydroxide solution to 6.3 ml/min and changing the proportions as shown in Table 1, a uniform BR 01/Polymer A/Polymer C/NaOH mixed composition was obtained by repeating the same operations as those carried out in Example 3. Pellets of the resulting uniform mixed composition were used to form a 3 mm thick sheet having a length and width of 150 mm each in a hot press molding machine. The sheet was visually examined, and found to be free of unreacted NaOH and free of undispersed masses of BR. The properties of the resulting golf ball material were then evaluated. The results are shown in Table 1.

Example 5

Aside from changing the proportions of Polymer A, Polymer C and NaOH to those indicated in Table 1 (and changing the injection rate of the 30 wt % aqueous sodium hydroxide solution from 6.3 to 6.7 ml/min), a uniform BR01/Polymer A/Polymer C/NaOH mixed composition was obtained by repeating the same operations as those carried out in Example 4. Pellets of the resulting uniform mixed composition were used to form a 3 mm thick sheet having a length and width of 150 mm each in a hot press molding machine. The sheet was visually examined, and found to be free of unreacted NaOH and free of undispersed masses of BR. The properties of the resulting golf ball material were then evaluated. The results are shown in Table 1.

Example 6

Aside from adding Polymer B to BR 01, Polymer A and Polymer C and changing the proportions as shown in Table 1, a uniform BR 01/Polymer A/Polymer B/Polymer C/NaOH mixed composition was obtained by repeating the same operations as those carried out in Example 5. Pellets of the resulting uniform mixed composition were used to form a 3 mm thick sheet having a length and width of 150 mm each in a hot press molding machine. The sheet was visually examined, and found to be free of unreacted NaOH and free of undispersed masses of BR. The properties of the resulting golf ball material were then evaluated. The results are shown in Table 1.

Example 7

A 5-liter pressure kneader (temperature setting, 80° C.) was charged with a combined amount of 2.5 kg of BR01 and PO in the relative proportions shown in Table 1 and mixing was carried out for 20 minutes at a rotor speed of 35 rpm and an applied pressure of 0.49 MPa while controlling the mixing temperature to not more than 130° C., thereby giving a PO/BR01 mixture. Aside from using the resulting PO/BR01 mixture instead of BR01, a uniform PO/BR01/Polymer A/Polymer C/NaOH mixed composition was obtained by repeating the same operations as those carried out in Example 5. Pellets of the resulting uniform mixed composition were used to form a 3 mm thick sheet having a length and width of 150 mm each in a hot press molding machine. The sheet was visually examined, and found to be free of unreacted NaOH and free of undispersed masses of BR. The properties of the resulting golf ball material were then evaluated. The results are shown in Table 1.

Example 8

A 5-liter pressure kneader (manufactured by Naniwa Machinery Manufacturing Co., Ltd.; temperature setting, 90°

C.) was employed. The base polymer for the master batch (MB) was A-C580/Nucrel 599 blended in a weight ratio of 30/70, and the zinc oxide designated below as ZnO-2 (average particle size, 0.6 μm) was used. The kneader was charged with a combined amount of 2.0 kg of the A-C580/Nucrel 599 blend and the ZnO-2 in a 50/50 weight ratio, and mixing was carried out for 20 minutes at a rotor speed of 35 rpm under an applied pressure of 0.49 MPa while controlling the mixing temperature within a range of 120 to 130° C. The mixture was discharged as a strand from a 40 mm diameter twin-screw/ single-screw extruder (Naniwa Machinery Manufacturing Co., Ltd.; temperature setting, 170° C.), passed through a cooling water bath and by an air knife, then was rendered into pellets by a pelletizer. The melt flow rate of the resulting master batch having a ZnO-2 content of 50 wt % was 2.1 g/10 min (measured at 190° C. under a load of 2,160 g). This master batch is designated below as ZnO-2MB.

The ingredients used here are described below.

ZnO-2: A type of zinc oxide produced by Sakai Chemical Industry Co., Ltd. Average particle size, 0.8 μm. Particle size distribution, 0.07 to 3.00 μm.

A-C580: A polyethylene wax produced by Tomen Plastics Corporation. Acrylic acid content, 9.6 wt %; viscosity, 650 cps at 140° C.

Nucrel 599: An ethylene-methacrylic acid polymer produced by DuPont. Methacrylic acid content, 10 wt %; MFR, 450 g/10 min.

Comparative Example 1

For comparison with Example 1, instead of mixing ZnO-1 into a melt blend of POM and Polymer A, first Polymer A and ZnO-1 were melt blended, then POM was mixed into the resulting melt blend. That is, Polymer A and ZnO-1 were separately fed in the relative proportions indicated in Table 1 into the hopper of a twin-screw extruder set to a temperature of 190° C. and melt-mixed at a screw speed of 70 rpm and an extrusion rate of 10 kg/h while removing volatiles through a vacuum vent. The mixture was extruded as a strand from the extruder die, and passed through a cooling water bath. Excess water was removed with an air knife, then the strand was cut into pellets with a pelletizer, giving a uniform Polymer A/ZnO-1 melt blend.

Next, a dry blend of the Polymer A/ZnO-1 melt blend with POM was fed to the hopper of the above twin-screw extruder set to a temperature of 180° C. and the same operation as described above was repeated at a screw speed of 70 rpm and an extrusion rate of 10 kg/h while removing volatiles through the vacuum vent. The resulting mixture was pelletized, yielding a hazy Polymer A/ZnO-1/POM mixed composition. The properties of the resulting golf ball material were then evaluated. The results are shown in Table 1.

Comparative Example 2

For comparison with Example 3, instead of mixing NaOH into a melt blend of BR01 and Polymer A, first Polymer A and NaOH were melt blended, then BR01 was mixed in the resulting melt blend. That is, Polymer A was fed to the hopper of a twin-screw extruder set to a temperature of 170° C. and melt mixed at a screw speed of 70 rpm and an extrusion rate of 10 kg/h while injecting a 30 wt % aqueous sodium hydroxide solution at a rate of 8.3 ml/min with a liquid injection pump so as to set the amount of sodium hydroxide (NaOH) addition as indicated in Table 1 and while removing volatiles through a vacuum vent. The mixture was extruded as a strand from the extruder die, and passed through a cooling water bath. Excess water was removed with an air knife, then the strand was cut into pellets with a pelletizer, giving a uniform Polymer A/NaOH mixed composition.

Next, a 5-liter pressure kneader (temperature setting, 160° C.) was charged with a combined amount of 2.5 kg of Polymer A/NaOH and BR01 in the proportions shown in Table 1, and mixing was carried out for 20 minutes at a rotor speed of 35 rpm and under an applied pressure of 0.49 MPa while controlling the mixing temperature to not more than 170° C. The mixture was extruded as a strand from a 40 mm diameter twin-screw/single-screw extruder (temperature setting, 170° C.), and passed through a cooling water bath. Excess water was removed with an air knife, then the strand was cut into pellets with a pelletizer, yielding a Polymer A/NaOH/BR01 mixed composition.

Pellets of the resulting uniform mixed composition were used to form a 3 mm thick sheet having a length and width of 150 mm each in a hot press molding machine. The sheet was visually examined, and found to have undispersed masses of BR 01. The system as a whole was heterogeneous. The properties of the resulting golf ball material were then evaluated. The results are shown in Table 1.

Comparative Example 3

For comparison with Example 5, instead of mixing NaOH into a melt blend of BR01, Polymer A and Polymer C, preparation was carried out by first melt blending Polymer A, Polymer C and NaOH, then mixing BR01 into the resulting melt blend. That is, aside from using Polymer A and Polymer C instead of Polymer A alone, and aside from setting the rate at which the 30 wt % aqueous sodium hydroxide solution is injected with a liquid injection pump to 7.5 ml/min, the operations in Comparative Example 2 were repeated using the proportions indicated in Table 1, giving a Polymer A/Polymer C/NaOH/BR01 mixed composition.

Pellets of the resulting mixed composition were used to form a 3 mm thick sheet having a length and width of 150 mm each in a hot press molding machine. The sheet was visually examined, and found to be free of BR01 masses and uniformly dispersed. Polymer C functioned as a solubilizer for BR01 and Polymer A.

Comparative Example 4

For comparison with Example 7, instead of adding NaOH to a melt blend of PO/BR 01, Polymer A and Polymer C, preparation was carried out by first melt-blending Polymer A, Polymer C and NaOH, then adding PO/BR01. That is, the 5-liter pressure kneader (temperature setting, 80° C.) described in Example 7 was charged with a combined amount of 2.5 kg of BR01 and PO in the proportions shown in Table 1, and mixing was carried out for 20 minutes at a rotor speed of 35 rpm and under an applied pressure of 0.49 MPa while controlling the mixing temperature to not more than 130° C., thereby giving a PO/BR01 mixture.

Aside from using the foregoing PO/BR01 mixture instead of BR01, the operations in Comparative Example 3 were repeated using the proportions indicated in Table 1, giving a Polymer A/Polymer C/NaOH/PO/BR01 mixed composition. Pellets of the resulting mixed composition were used to form a 3 mm thick sheet having a length and width of 150 mm each in a hot press molding machine. The sheet was visually examined, and found to have undispersed masses of BR01. The system as a whole was heterogeneous. The properties of the resulting golf ball material were then evaluated. The results are shown in Table 1.

Reference Example 1

As a reference example, in the mixed composition of Example 1, the POM was omitted and the remaining Polymer A and ZnO-1 were separately fed in the proportions indicated in Table 1 to the hopper of the twin-screw extruder (temperature setting, 190° C.) described in Example 1 and melt mixing was carried out at a screw speed of 70 rpm and extrusion rate of 10 kg/h while removing volatiles through a vacuum vent. The extruded strand was pelletized in the same way as described above, giving a uniform Polymer A/ZnO-1 mixed composition. Pellets of the resulting uniform, transparent mixed composition were used to form a 3 mm thick sheet having a length and width of 150 mm each in a hot press molding machine. The sheet was visually examined, and found to be free of ZnO-1 in unreacted form and in the form of undispersed masses. The properties of the resulting golf ball material were then evaluated. The results are shown in Table 1.

Reference Example 2

As a reference example, in the mixed composition of Example 3, the BR01 was omitted and the remaining Polymer A and NaOH were separately fed in the proportions indicated in Table 3 to the hopper of the twin-screw extruder (temperature setting, 170° C.) described in Example 3 and melt mixing was carried out at a screw speed of 70 rpm and extrusion rate of 10 kg/h while injecting a 30 wt % aqueous sodium hydroxide solution at a rate of 8.3 ml/min with a liquid injection pump so as to set the amount of sodium hydroxide (NaOH) addition as indicated in Table 1 and while removing volatiles through a vacuum vent. The extruded strand was pelletized in the same way as described above, thereby giving a uniform Polymer A/NaOH mixed composition. Pellets of the resulting uniform mixed composition were used to form a 3 mm thick sheet having a length and width of 150 mm each in a hot press molding machine. The sheet was visually examined, and found to be free of unreacted NaOH. The properties of the resulting golf ball material were then evaluated. The results are shown in Table 1.

TABLE 1

| | Example | | | | | | |
|---|---|---|---|---|---|---|---|
| | 1 | 2 | 3 | 4 | 5 | 6 | 7 |
| PO | — | — | — | — | — | — | $0.1_{(1)}$ |
| NaOH | — | — | $1.34_{(2)}$ | $1.14_{(2)}$ | $1.21_{(2)}$ | $1.21_{(2)}$ | $1.21_{(4)}$ |
| BR01 | — | — | $10_{(1)}$ | $10_{(1)}$ | $10_{(1)}$ | $10_{(1)}$ | $10_{(1)}$ |
| Polymer C | — | — | — | $10_{(1)}$ | $20_{(1)}$ | $10_{(1)}$ | $20_{(2)}$ |
| Polymer B | — | — | — | — | — | $10_{(1)}$ | — |
| ZnO-2MB | — | $2.72_{(2)}$ | — | — | — | — | — |
| ZnO-1 | $1.36_{(2)}$ | — | — | — | — | — | — |
| POM | $10_{(1)}$ | $10_{(1)}$ | — | — | — | — | — |
| Polymer A | $90_{(1)}$ | $90_{(1)}$ | $90_{(1)}$ | $80_{(1)}$ | $70_{(1)}$ | $70_{(1)}$ | $70_{(3)}$ |
| MFR (g/10 min) | 1.2 | 1.3 | 0.1 | 0.2 | 0.2 | 0.1 | 0.2 |
| Hardness (Shore D) | 59 | 58 | 50 | 45 | 41 | 47 | 45 |
| UTS (MPa) | 22 | 22 | 20 | 15 | 12 | 15 | 15 |
| UTE (%) | 488 | 490 | 418 | 428 | 402 | 381 | 406 |
| Remarks | Homogeneous phase | | | | | | |

| | Comparative Example | | | | Reference Example | |
|---|---|---|---|---|---|---|
| | 1 | 2 | 3 | 4 | 1 | 2 |
| PO | — | — | — | $0.1_{(4)}$ | — | — |
| NaOH | — | $1.34_{(1)}$ | $1.21_{(2)}$ | $1.21_{(3)}$ | — | $1.49_{(2)}$ |
| BR01 | — | $10_{(2)}$ | $10_{(3)}$ | $10_{(4)}$ | — | — |
| Polymer C | — | — | $20_{(1)}$ | $20_{(2)}$ | — | — |
| Polymer B | — | — | — | — | — | — |
| ZnO-2MB | — | — | — | — | — | — |
| ZnO-1 | $1.36_{(1)}$ | — | — | — | $1.51_{(2)}$ | — |
| POM | $10_{(2)}$ | — | — | — | — | — |
| Polymer A | $90_{(1)}$ | $90_{(1)}$ | $70_{(1)}$ | $70_{(1)}$ | $100_{(1)}$ | $100_{(1)}$ |
| MFR (g/10 min) | 1.0 | 0.4 | 0.5 | 0.5 | 4.6 | 0.4 |
| Hardness (Shore D) | 58 | 50 | 42 | 44 | 54 | 55 |
| UTS (MPa) | 21 | 21 | 11 | 8 | 16 | 24 |
| UTE (%) | 454 | 425 | 371 | 56 | 471 | 451 |
| Remarks | | Hazy (heterogeneous) phase | Homogeneous phase | Heterogeneous phase | | |

Amounts of components are given in parts by weight.
Numbers in parentheses ( ) indicate the order in which components were blended.

The ingredients are described below.

PO: Dicumyl peroxide produced by NOR Corp.; 1 minute half-time temperature, 175° C.

NaOH: 20 wt % aqueous sodium hydroxide solution (product of Kanto Chemical, guaranteed reagent grade)

BR01: The polybutadiene BR01 produced by JSR Corporation; cis-1,4 bond content, 96%; nickel polymerization catalyst.

ZnO-1: Nanofine-50 produced by Sakai Chemical Industry Co., Ltd. A zinc oxide having an average particle size of 20 nm and a particle size distribution of 1 to 100 nm. Proportion of component having particle size≦0.05 μm, about 60%.

at an injection pressure of 4.9 to 8.2 MPa, a dwell pressure of 4.4 to 7.1 MPa, an injection and dwell time of 8 seconds, and a cooling time of 30 seconds, thereby producing a three-piece golf ball (diameter, 42.7 mm; weight, 45.3 g). These golf balls were then evaluated. The results are shown in Table 2.

Comparative Examples 5 and 6

These comparative examples correspond respectively to Examples 8 and 9. Using 10 the materials in Comparative Examples 1 and 4 as the cover materials, three-piece golf balls were produced under the same injection molding conditions as in Examples 8 and 9. The golf balls were then evaluated. The results are shown in Table 2.

TABLE 2

| | | Example | | Comparative Example | |
|---|---|---|---|---|---|
| | | 8 | 9 | 5 | 6 |
| GB Cover Material | | material from Example 1 | material from Example 7 | material from Comparative Example 1 | material from Comparative Example 4 |
| Deflection (mm) | | 3.59 | 3.71 | 3.58 | 3.70 |
| Initial | 0° | 73.52 | 73.77 | 73.47 | 73.74 |
| Velocity (m/sec) | 23° | 74.96 | 75.53 | 75.01 | 75.51 |
| C.O.R | | 0.730 | 0.743 | 0.730 | 0.728 |
| Shot Number (Durability) | | 494 | 476 | 455 | 136 |
| Scuff Resistance 23° C. | | Good | Good | Good | Poor |
| Abrasion Resistance (Sand) | | Good | Good | Good | Poor |
| Remarks | | Good durability Good uniformity | | Less durability | Poor durability Poor uniformity |

ZnO-2MB: A master batch that is 50 wt % zinc oxide (ZnO-2). The base resin A-C580/Nucrel 599 has a weight ratio of 30/70.

POM: AMILAS S761, a polyacetal produced by Toray Corporation. MFR, 9.6 g/10 min; melting point, 166° C.; Rockwell hardness (R scale), 115.

Polymer A: AN4214C, an ethylene-methacrylic acid copolymer produced by DuPont-Mitsui Polychemicals Co., Ltd.; methacrylic acid content, 4 wt %; MFR, 7 g/10 min.

Polymer B: Polybond 3200, a maleic anhydride-grafted polypropylene produced by Uniroyal Chemical. Maleic anhydride content, 1.0 wt %; MFR, 110 g/10 min.

Polymer C: Vamac G, an ethylene-methyl acrylate-monoethyl maleate terpolymer having a monoethyl maleate content of 1.0 wt % and an MFR of 7.0 g/10 min.

The physical properties of the golf balls in the table were measured as described below.

MFR (g/10 min): Measured in accordance with JIS-K7210 at a test temperature of 190° C. and under a test load of 21.18 N (2.16 kgf).

Shore D hardness: Shore D hardness measured in accordance with ASTM D-2240.

Elongation at break (%), Tensile strength (MPa): Measured in accordance with JIS-K7161.

Examples 8 and 9

The materials obtained in Examples 1 and 7 were used as the cover materials in three-piece golf balls. In each example, the cover material was injection molded over a two-layer spherical solid body (diameter, 39.7 mm; weight, 38.7 g; compressive strain, 4.20 mm) composed of a crosslinked butadiene rubber core and an intermediate layer made of terpolymer ionomer in an injection molding machine (temperature settings: hopper, 150° C.; C1 to head, 220 to 200° C.)

Deflection (mm)

The amount of deflection (mm) by the ball when placed on a hard plate and subjected to an increase in load from an initial load of 98 N (10 kgf) to a final load of 1,275 N (130 kgf) was measured.

Initial Velocity

The initial velocity was measured using an initial velocity measuring apparatus of the same type as the USGA drum rotation-type initial velocity instrument approved by the R&A. The ball was temperature conditioned at 23±2° C. for at least 3 hours, then tested in a chamber at a room temperature of 23±2° C. The ball was hit using a 250-pound (113.4 kg) head (striking mass) at an impact velocity of 143.8 ft/s (43.83 m/s). One dozen balls were each hit four times. The time taken to traverse a distance of 6.28 fit (1.91 m) was measured and used to compute the initial velocity of the ball. This cycle was carried out over a period of about 15 minutes.

Coefficient of Restitution (COR)

The golf ball was fired from an air cannon at a velocity of 43 m/s against a steel plate, and the rebound velocity was measured. The coefficient of restitution (COR) is the ratio of the ball's initial velocity to its rebound velocity.

Shot Number (Durability)

The durability of each golf ball was evaluated using an ADC Ball COR Durability Tester produced by Automated Design Corporation (U.S.). This tester has the ability to shoot a golf ball using air pressure and cause it to repeatedly strike two parallelly arranged metal plates. The number of shots required for a ball to crack was treated as the indicator of durability. In this case, an average value was obtained by furnishing 7 balls of the same type for testing and averaging the number of times each ball had to be shot before it cracked. The type of tester used was a horizontal COR durability tester, and the speed of the balls at the time of impact with the metal plates was 43 m/s.

Scuff Resistance

The golf balls were held at a temperature of 23° C. and hit at a head speed of 33 m/s using a pitching wedge mounted on a swing robot machine, after which damage from the impact was visually rated according to the following criteria.

Good: No damage whatsoever or substantially free of apparent damage.

Poor: Surface is frayed and damaged dimples are apparent.

Abrasion Resistance (Sand)

A tubular container having a five liter capacity was filled with 15 golf balls and 1.7 liters of sand, after which the contents were mixed at 50 rpm for 2 hours. The balls were then removed and the extent of surface marring and decrease in gloss due to abrasion were visually rated according to the following criteria.

Good: Little damage or damage of a decrease that has substantially no adverse effect on use; no decrease in gloss.

Poor: Damage is conspicuous and accompanied by some decrease in gloss.

On comparing Example 8 with Comparative Example 5 and Example 9 with Comparative Example 6, the golf balls obtained in the examples according to the invention had better durabilities (higher shot number) and better heat resistance during injection molding (less scorching of the resin). In the comparison involving a butadiene rubber system (Example 9 and Comparative Example 6) in particular, the example according to the invention had a much better scuff resistance. The initial velocity and coefficient of restitution in the examples according to the invention were about the same as in the comparative examples and showed no apparent decline.

The invention claimed is:

1. A golf ball characterized by comprising a molding made from a golf ball material comprising a blend of the following essential components A to C:
   (A) an olefin-containing thermoplastic polymer having an acid content of at least 0.5 wt % but less than 5.0 wt %;
   (B) a resin composition comprising one or more polyacetals resins; and
   (C) an oxygen-containing metal compound,
   wherein at least some of the unneutralized acid groups present in the composition of components A and B are neutralized by component C and
   wherein component B is a polyacetal homopolymer and/or a polyacetal copolymer having an impact strength of 35 to 130 J/m and a flexural modulus of 2.50 to 3.10 GPa.

2. The golf ball of claim 1, wherein the acid component included in the copolymer of component A is one or more selected from among unsaturated carboxylic anhydrides, unsaturated dicarboxylic acids, unsaturated dicarboxylic acid half esters and unsaturated carboxylic acids.

3. The golf ball of claim 1, wherein a resin composition obtained by mixing together component A and component B has a content of at least one type of acid component selected from among unsaturated carboxylic anhydrides, unsaturated dicarboxylic acids, unsaturated dicarboxylic acid half esters and unsaturated carboxylic acids of at least 0.1 wt % but less than 5.0 wt %.

4. The golf ball of claim 1, wherein component B is a thermoplastic polymer and components A and B are blended together in a weight ratio A/B of 50/50 to 99/1.

5. The golf ball of claim 1, wherein component B is a thermoset polymer and components A and B are blended together in a weight ratio A/B of 55/45 to 99/1.

6. The golf ball of claim 1, wherein component C is selected from among oxygen-containing inorganic metal compounds capable of neutralizing at least some of the acid groups present in the resin composition of components A and B; the oxygen-containing inorganic metal compound is a metal oxide, a metal carbonate or a metal hydroxide; and the metal ionic species is selected from among groups IA, IB, IIA, IIB, IIIA, IIIB, IVA, IVB, VA, VB, VIA, VIB, VIIB and VIIIB of the periodic table.

7. The golf ball of claim 1, wherein component C is used in at least one of the following forms:
   (i) a master batch comprising the oxygen-containing inorganic metal compound and polymer materials;
   (ii) finely ground particles of the oxygen-containing inorganic metal compound;
   (iii) a solution of the oxygen-containing inorganic metal compound.

8. The golf ball of claim 1, wherein component C is a master batch obtained by blending 10 to 90 wt % of the oxygen-containing inorganic metal compound with thermoplastic resins having a melt flow rate (MFR) of at least 50 g/10 min.

9. The golf ball of claim 1, wherein component C is one or more selected from the group consisting of magnesium carbonate, magnesium acetate, magnesium oxide, zinc oxide, zinc acetate, sodium hydroxide, sodium carbonate, calcium oxide, calcium hydroxide, lithium hydroxide, lithium carbonate, potassium hydroxide and potassium carbonate.

10. The golf ball of claim 1, wherein component C is selected from among zinc oxide, magnesium oxide and calcium oxide.

11. The golf ball of claim 1, wherein the acid groups in the composition obtained by blending together components A and B have a degree of neutralization in a range of 2 to 98%.

12. The golf ball of claim 1, wherein component C is a finely ground metal oxide which is selected from among oxygen-containing inorganic metal compounds having an average particle size of 0.005 to 0.1 μm and a particle size distribution of 0.001 to 1.0 μm.

13. The golf ball of claim 1, wherein the golf ball material has, in Fourier transform infrared absorption spectroscopic (FT-IR) measurements, an absorption peak attributable to carbonyl stretching vibrations at 1690 to 1710 $cm^{-1}$ and an absorption peak attributable to the carboxylate anion stretching vibrations of a carboxylate metal salt at 1530 to 1630 $cm^{-1}$.

14. A golf ball characterized by the use of a golf ball material comprising a blend of the following essential components A to C:
   (A) an olefin-containing thermoplastic polymer having an acid content of at least 0.5 wt % but less than 5.0 wt %;
   (B) a resin composition comprising one or more polyacetals resins; and
   (C) an oxygen-containing inorganic metal compound,
   wherein at least some of the unneutralized acid groups present in the composition of components A and B are neutralized by component C and
   wherein component B is a polyacetal homopolymer and/or a polyacetal copolymer having an impact strength of 35 to 130 J/m and a flexural modulus of 2.50 to 3.10 GPa;
   wherein the golf ball material is used as a cover material or intermediate layer material in a two-piece solid golf ball composed of a core and a cover which encloses the core, or in a multi-piece solid golf ball composed of a core of at least one layer, at least one intermediate layer which encloses the core, and a cover of at least one layer which encloses the intermediate layer.

* * * * *